(12) United States Patent
Wright

(10) Patent No.: US 9,137,849 B1
(45) Date of Patent: Sep. 15, 2015

(54) DYNAMICALLY SWITCHING COMMUNICATION MODES IN MULTI-STANDARD WIRELESS COMMUNICATION DEVICES

(75) Inventor: David G. Wright, San Diego, CA (US)

(73) Assignee: CYPRESS SEMICONDUCTOR CORPORATION, San Jose, CA (US)

( * ) Notice: Subject to any disclaimer, the term of this patent is extended or adjusted under 35 U.S.C. 154(b) by 1052 days.

(21) Appl. No.: 12/634,511

(22) Filed: Dec. 9, 2009

Related U.S. Application Data

(60) Provisional application No. 61/121,122, filed on Dec. 9, 2008, provisional application No. 61/147,954, filed on Jan. 28, 2009.

(51) Int. Cl.
*H04B 7/212* (2006.01)
*H04W 88/02* (2009.01)
*H04W 74/04* (2009.01)
*H04W 28/04* (2009.01)

(52) U.S. Cl.
CPC ............ *H04W 88/026* (2013.01); *H04W 74/04* (2013.01); *H04W 28/04* (2013.01)

(58) Field of Classification Search
CPC .. H04W 28/26; H04W 4/008; H04W 72/1215
See application file for complete search history.

(56) References Cited

U.S. PATENT DOCUMENTS

| | | | |
|---|---|---|---|
| 6,643,522 B1 | 11/2003 | Young | |
| 6,816,500 B1 * | 11/2004 | Mannette et al. | 370/431 |
| 6,847,625 B2 | 1/2005 | Heinonen et al. | |
| 7,542,728 B2 | 6/2009 | Bitran et al. | |
| 7,546,140 B2 | 6/2009 | Sinai | |
| 8,126,488 B2 * | 2/2012 | Albert et al. | 455/502 |
| 8,577,403 B2 * | 11/2013 | Shoemake et al. | 455/512 |
| 2003/0143953 A1 * | 7/2003 | Schmandt et al. | 455/41 |
| 2004/0176065 A1 * | 9/2004 | Liu | 455/343.1 |
| 2005/0208956 A1 * | 9/2005 | Takagi et al. | 455/464 |
| 2005/0232219 A1 * | 10/2005 | Aiello et al. | 370/348 |
| 2005/0272467 A1 * | 12/2005 | Chiu et al. | 455/553.1 |
| 2006/0256712 A1 * | 11/2006 | Imajuku et al. | 370/218 |
| 2007/0091837 A1 * | 4/2007 | Li et al. | 370/328 |
| 2007/0197256 A1 | 8/2007 | Lu et al. | |
| 2007/0263709 A1 * | 11/2007 | Kasslin et al. | 375/222 |
| 2008/0002758 A1 * | 1/2008 | Schmidt et al. | 375/130 |
| 2008/0069071 A1 * | 3/2008 | Tang | 370/342 |
| 2008/0200120 A1 | 8/2008 | Ruuska et al. | |

(Continued)

FOREIGN PATENT DOCUMENTS

| | | |
|---|---|---|
| WO | 2009046767 A1 | 4/2009 |
| WO | 2009055714 A2 | 4/2009 |
| WO | 2009090503 A1 | 7/2009 |

OTHER PUBLICATIONS

Howitt, Ivan, "Bluetooth Performance in the Presence of 802.11b WLAN", IEEE Transactions on Vehicular Technology, vol. 51, No. 6, Nov. 2002.

*Primary Examiner* — Brandon Renner
*Assistant Examiner* — Abdelnabi Musa
(74) *Attorney, Agent, or Firm* — Lowenstein Sandler LLP

(57) ABSTRACT

A method may include selecting at least an initial communication mode from a plurality of communication modes that each communicate with a master device using time division multiple access (TDMA); and dynamically switching communication modes between the master device and at least slave device in accordance with at least one predetermined characteristic of the wireless system.

19 Claims, 10 Drawing Sheets

(56) References Cited

U.S. PATENT DOCUMENTS

2008/0232299 A1* 9/2008 Mosig .................... 370/328
2008/0240048 A1* 10/2008 Okker et al. ............ 370/338
2008/0259837 A1* 10/2008 Thoukydides .......... 370/311
2009/0016313 A1* 1/2009 Wu ......................... 370/345
2009/0164480 A1 6/2009 Lappetelainen et al.
2011/0032882 A1* 2/2011 Zechlin et al. ......... 370/329
2011/0154082 A1* 6/2011 Parks et al. ............. 713/323

* cited by examiner

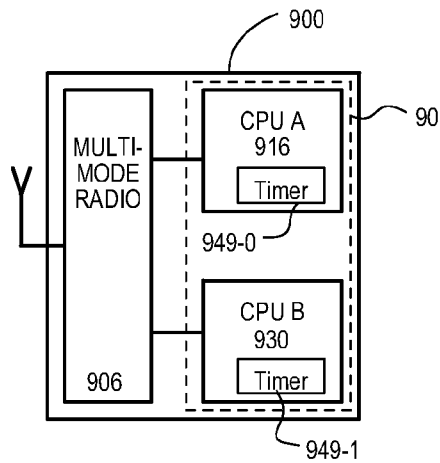
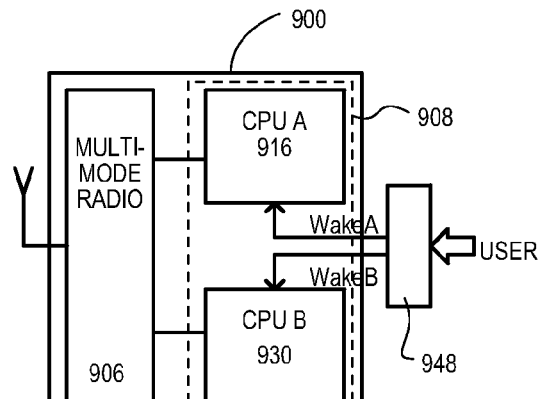
FIG. 9A    FIG. 9B
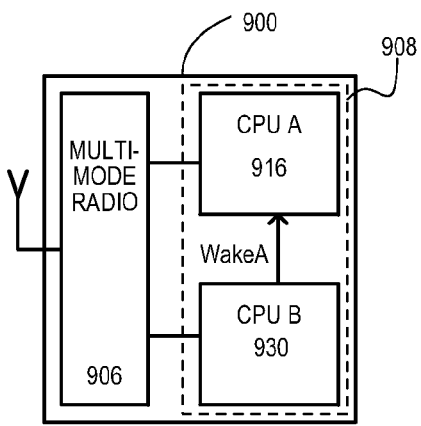
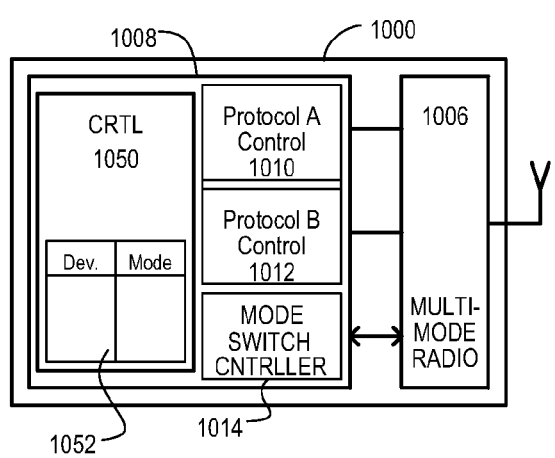
FIG. 9C    FIG. 10
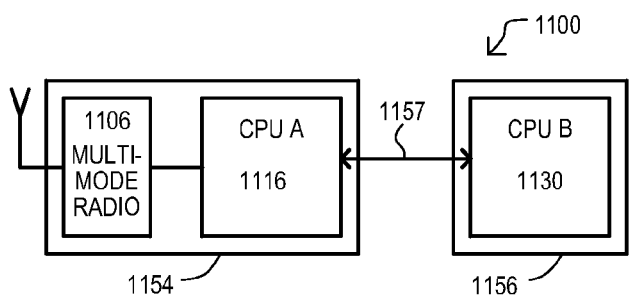
FIG. 11

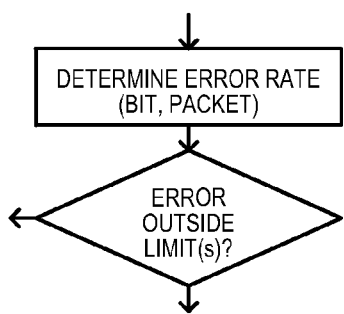
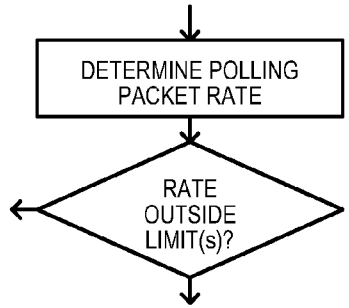
FIG. 18A
FIG. 18B
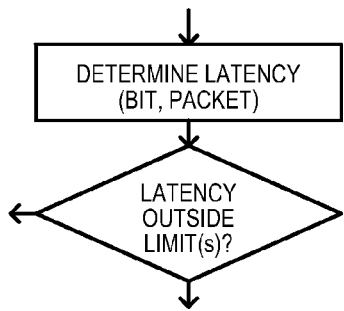
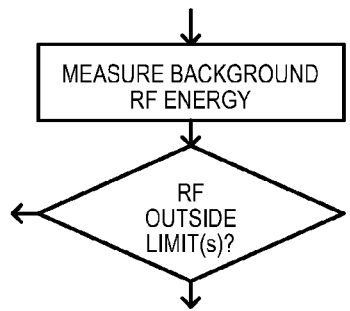
FIG. 18C
FIG. 18D
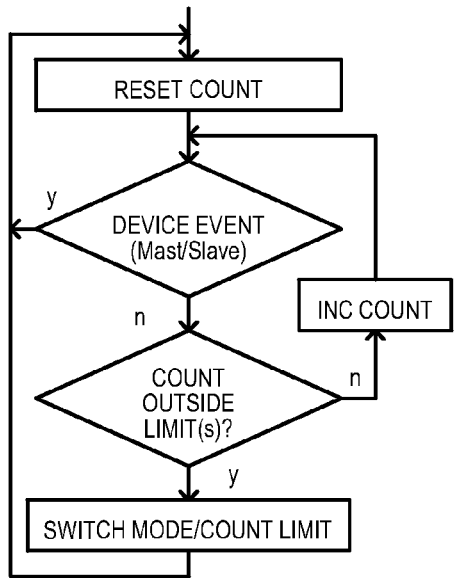
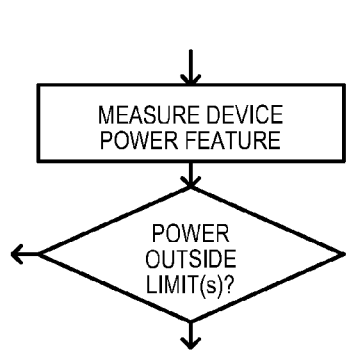
FIG. 18F
FIG. 18E

DYNAMICALLY SWITCHING COMMUNICATION MODES IN MULTI-STANDARD WIRELESS COMMUNICATION DEVICES This application claims the benefit of U.S. provisional patent applications having Ser. No. 61/121,122 filed on Dec. 9, 2008, and Ser. No. 61/147,954 filed on Jan. 28, 2009, the contents of both of which are incorporated by reference herein.

TECHNICAL FIELD

The present disclosure relates to wireless communication devices, and more particularly, to devices that may communicate by two or more different standards.

BRIEF DESCRIPTION OF THE DRAWINGS

FIGS. 9A to 9C shows devices and methods for disabling/enabling protocol specific hardware according to embodiments.

FIG. 10 is a block diagram of a master device according to an embodiment.

FIG. 11 is a block diagram of a device according to another embodiment.

FIG. 18A to 18H show various characteristics for controlling dynamic switching according to embodiments.

DETAILED DESCRIPTION

Figure 1A:
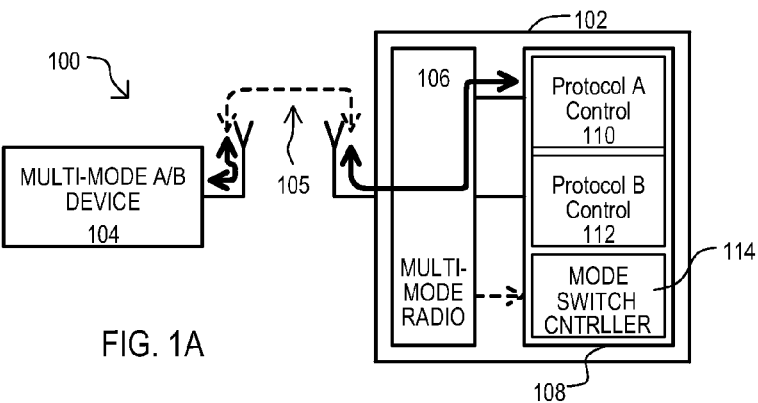
FIGS. 1A and 1B are block diagrams showing a system according to an embodiment.

Various embodiments will now be described that show devices, methods and systems for wireless communication between devices in which a communication method may be switched dynamically between different modes. In particular embodiments, such dynamic switching may be in response to system characteristics including, but not limited to, status of a communication link or status of one or more devices in a system.

In the various embodiments described herein, like sections may be referred to by the same reference character but with the leading digit(s) corresponding to the figure number.

Figure 1B:
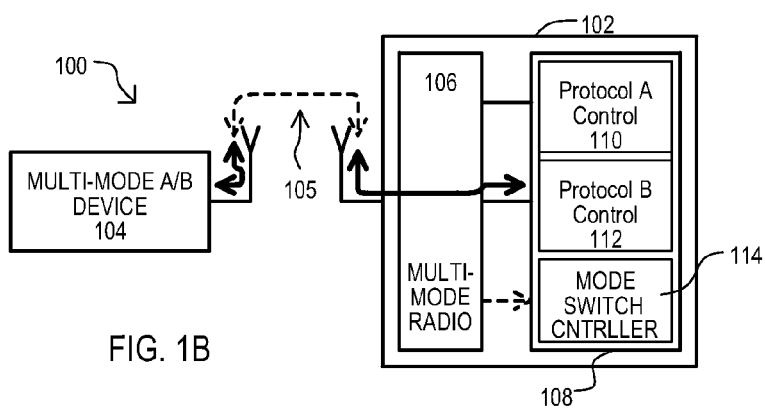

Referring now to FIGS. 1A and 1B, a system according to a first embodiment is shown in a block schematic diagram and designated by the general reference character 100. A system 100 may include one or more slave devices (one shown as 102) each connected to a master device 104 over wireless physical communication link 105.

A slave device 102 may include a multiple mode (multi-mode) radio circuit 106 and processing circuits 108. A multi-mode radio circuit 106 may be a radio transmitter and receiver having two or more modes of communication. Different modes of communication may include any of the following: different types of modulation, different transmission channel selection and construction (e.g., frequency selection and/or progression) and/or different error correction.

In one embodiment, a multi-mode radio circuit 106 may be a digital radio-frequency (RF) transceiver that transmits and receives signals over a single antenna. In an alternate embodiment, a multi-mode radio circuit may include two or more antennas, where one antenna is used for multiple communication protocols. In one particular embodiment, a multi-mode radio circuit 106 may provide different communication modes with at least two different types of frequency modulation, over different possible carrier frequency sets. In a very particular embodiment, a multi-mode radio circuit 106 may operate according to at least the physical layers of the standard Bluetooth® specification (BT) as well as the Bluetooth® low energy (BLE) specification, both published by the Bluetooth Special Interest Group (SIG), having headquarters at 500 108$^{th}$ Avenue NE, Suite 250, Bellevue, Wash. 98004, USA. The contents of both of these specifications are incorporated by reference herein. In still other particular embodiments, operations may occur according to BT and a proprietary protocol, such as Cypress WirelessUSB, promulgated by Cypress Semiconductor Corporation, having headquarters at 198 Champion Court, San Jose, Calif. 95134, USA and/or the ANT+ protocol promulgated by ANT Wireless, having headquarters at 228 River Avenue, Cochrane, Alberta, Canada, T4C 2C1. In addition or alternatively, embodiments may communicate according to BT and one or more open standards, such as any of the IEEE 802.11 wireless standards (i.e., WiFi).

Processing circuits 108 may include a first protocol (Protocol A) section 110, a second protocol (Protocol B) section 112, and mode switch controller 114. A first protocol section 110 may process signals from a multi-mode radio 106 according to at least a first set of rules. Similarly, a second protocol section 112 may process signals from a multi-mode radio 106 according to at least a second set of rules. As will be described below, in some embodiments first and second protocol sections (110 and 112) may share all or a portion of hardware resources, or may have separate hardware resources. Further, first and second protocol sections (110 and 112) may share all or a portion of instructions in the event processor circuits are included in such a section.

A mode switch controller 114 may dynamically switch operations of multi-mode radio 106 and first and second protocol sections (110 and 112) according to one or more predetermined characteristics of the system 100. A mode switch controller 114 may determine conditions based on inputs from a master device 104, a multi-mode radio 106, one or both protocol sections (110 or 112), and/or external events. Very particular examples of such system conditions will be described in other embodiments below.

FIG. 1A shows system 100 communicating according to a first mode. Signals may be transmitted between a master device 104 and slave device 102 over wireless physical link 105 according to a first mode. Multi-mode radio 106 may transmit and receive signals according to a first mode. First protocol section 110 may process data from radio 106 according to a Protocol A, to thereby provide communication data to a device 102. In a like fashion, first protocol section 110 may process outgoing data to radio 106 according to Protocol A, and radio 106 may transmit such data to master device 104 according to a first mode.

FIG. 1B shows system 100 after mode switch controller 114 causes a switch in operations according to one or more characteristics. In response to mode switch controller 114, multi-mode radio 106 may switch to receive and transmit signals according to a second mode. Second protocol section 112 may process data for radio 106 according to a Protocol B.

It is noted that in particular embodiments, a switching of modes (e.g., FIG. 1A to FIG. 1B) is dynamic. That is, such switching may occur after a master device 104 and slave device 102 have established an initial communication method. Further, such switching may continually switch back and forth among different methods according to one or more system characteristics. Various examples of switching characteristics will be described in more detail below.

While the embodiment of FIGS. 1A and 1B has shown a slave device that may process signals according to two protocols, other embodiments may be capable of processing even larger numbers of different protocols.

In this way, a device in a wireless system may dynamically switch between different communication modes in response to characteristics of the system.

Figure 2:
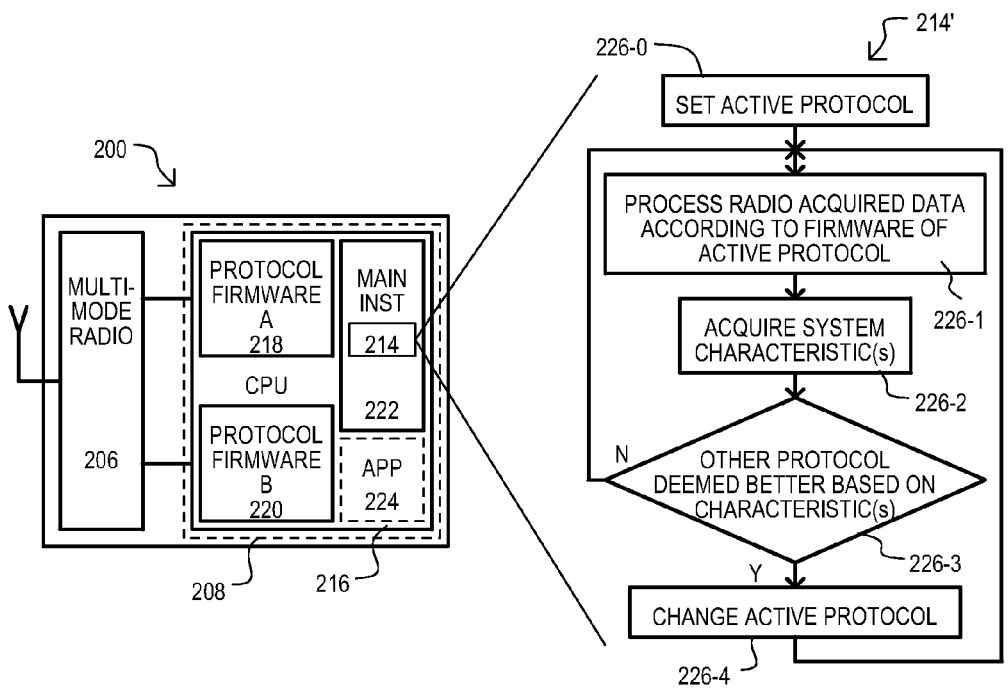
FIG. 2 is a block diagram and a flow diagram showing a device according to an embodiment.

Referring to FIG. 2, another device embodiment is shown in a block schematic diagram and designated by the general reference character 200. Device 200 may include a multi-mode radio 206 as described in other embodiments herein, and equivalents, and processing circuits 208. A device 200 may communicate with one or more other devices in a system via a wireless link.

In the embodiment of FIG. 2, processing circuits 208 may include a central processing unit (CPU) 216, first protocol firmware 218, second protocol firmware 220, main instructions 222, and optionally, application instructions 224. A CPU 216 may execute main instructions 222 in executing various functions of the device. In executing such functions, a CPU 216 may access first protocol firmware 218 to process data to/from radio 206 according to a first protocol, and access second protocol firmware 220 to process data to/from radio 206 according to a second protocol.

In the very particular embodiment shown, a device 200 may switch between modes in response to a mode switch controller 214, which may be one or more functions executed by the CPU 216 with or without peripheral circuits. FIG. 2 shows one very particular implementation of a mode switch controller 214' as a process executable by CPU 216.

Mode switch controller 214' may include setting an active protocol (226-0). An active protocol may be a protocol by which all or a majority of communications occur over a wireless link. In some embodiments, such an action may include utilizing default protocol, while in other embodiments, such an action may include negotiating an active protocol with another device (e.g., master and slave initial negotiation). Radio transmitted data (i.e., received and/or sent) may be processed according to the active protocol (226-1). Such an action may include CPU 216 utilizing first protocol firmware 218 to process data.

A mode switch controller 214' may acquire system characteristics (226-2). Such an action may include acquiring characteristics of any device in the system and/or characteristics of one or more wireless links of the system. Particular characteristics will be described in more detail below.

Based upon acquired characteristics, a determination may be made on whether or not a different protocol would be better (226-3). If another protocol is not deemed better (N from 226-3), data may continue to be processed according to the current protocol. If another protocol is deemed better (Y from 226-3), the active protocol may be switched (226-4). Such an action may include CPU 216 switching to utilizing a second protocol firmware 220 to process data.

Optionally, a CPU 216 may execute application instructions 224 for performing higher level functions of a device 200. As but one example, if a device 200 is a peripheral device of a computer (e.g., keyboard, mouse), such application instructions may scan keys and/or derive and transmit position information, etc.

In this way, a device may include a processing unit that dynamically switches between different modes of operation by executing different instruction sets when processing data to/from a radio circuit.

Figures 3, 4:
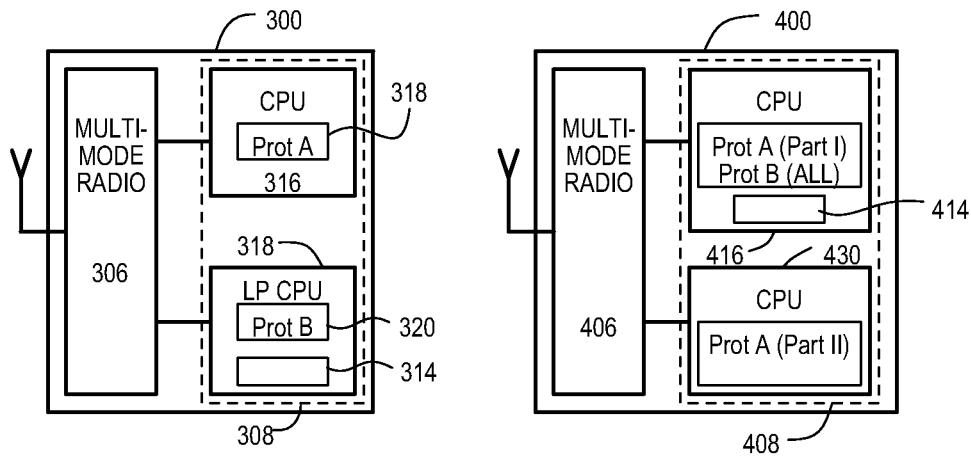
FIGS. 3-7 are block diagrams showing devices according to various other embodiments.

Referring now to FIG. 3, another device according to an embodiment is designated by the reference character 300. While some embodiments may include a single processor (e.g., CPU) executing different instruction sets when switching between communication modes, other embodiments, like that of FIG. 3, may include multiple processors. Device 300 may include a multi-mode radio 306 as described in other embodiments herein and equivalents, and processing circuits 308.

In the embodiment of FIG. 3, processing circuits 308 may include a first CPU 316 and a low power CPU 318. A first CPU 316 may process radio related data according to a first protocol. A low power CPU 318 may process radio related data according to a second protocol, and in doing so, may consume less power, than first CPU 316. A low power CPU 318 may consume less power due to manufacturing construction, architecture, firmware, or combinations thereof, as but a few examples.

In the embodiment shown, a mode switch controller 314 may be formed in, or created by, low power CPU 318. In one particular embodiment, when a low power CPU 318 is not executing instructions according to its protocol, it may still function as a mode switch controller 314.

In this way, a device may switch between different processing units with different power consumption profiles when dynamically changing between different modes of operation.

Referring now to FIG. 4, another device according to a further embodiment is designated by the reference character 400. Device 400 may include a multi-mode radio 406 as described in other embodiments herein, and equivalents, and processing circuits 408.

In the embodiment of FIG. 4, processing circuits 408 may include a first CPU 416 and a second CPU 430. Unlike the embodiment of FIG. 3, a first CPU 416 may provide all processing for radio related data according to a one protocol (Protocol B), while providing for some of the processing for another protocol (Protocol A). A second CPU 430 may provide for remaining processing for the other protocol (Protocol A). Accordingly, when a device 400 operates according to one protocol (Protocol B), one CPU (416) may be active, while the other CPU (430) is inactive. In contrast, when a device 400 operates according to another protocol (Protocol A), both CPUs (416 and 430) may be active.

In a very particular embodiment, one CPU (e.g., 416 or 430) may execute instructions for connecting to a network according to Protocol A, while the other of the CPUs (e.g., 430 or 416) may execute instructions for maintaining a link to other devices (e.g., master device) once such a link has been established.

In this way, a device may utilize different numbers of processing units when dynamically changing between different modes of operation.

Figure 5:
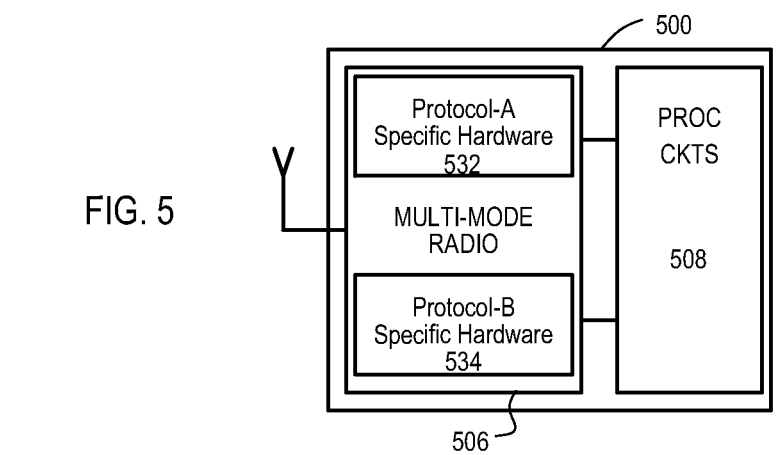

Referring to FIG. 5, another device according to an embodiment is shown in a block schematic diagram and designated by the general reference character 500. Device 500 may include a multi-mode radio 506 as well as processing circuits 508. Processing circuits 508 may take the form of those shown in other embodiments, and equivalents. In particular, in some multi-processor environments, radio hardware specific to one protocol may be connected to CPU executing operations according to the same protocol, while radio hardware specific to another protocol may be connected to CPU executing operations according to such another protocol.

A multi-mode radio 506 may include protocol specific hardware. In the embodiment of FIG. 5, multi-mode radio 506 may include first radio hardware 532, specific to one protocol (Protocol A) and second radio hardware 534 specific to a second protocol (Protocol B). Remaining portions of multi-mode radio 506 may be shared with different protocols.

In a very particular embodiment, protocol specific hardware may include, without limitation, modulation circuits, filter circuits, packet header recognition circuitry, and/or framing circuits. Shared radio hardware may include a power amplifier, a low noise amplifier, and/or a mixer circuit and/or frequency synthesizer, as but a few examples.

In this way, a device that dynamically switches between wireless communication modes may include a radio having protocol specific hardware, and hardware shared among multiple protocols.

Figure 6:
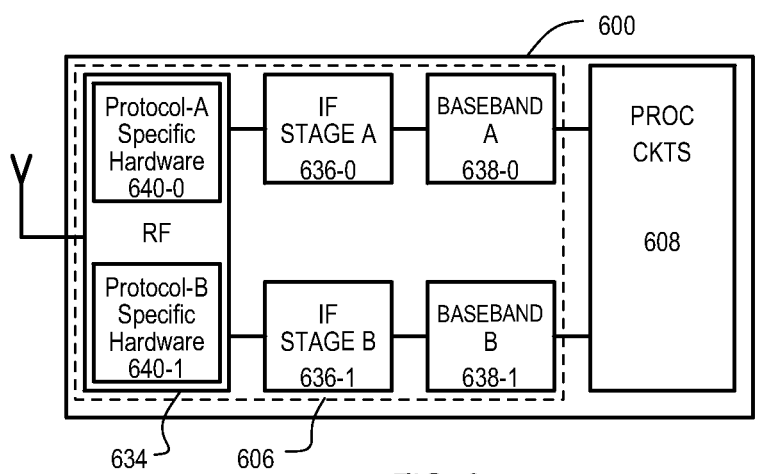

Referring to FIG. 6, yet another device according to an embodiment is shown in a block schematic diagram and designated by the general reference character 600. Device 600 may include a multi-mode radio 606 as well as processing circuits 608. Processing circuits 608 may take the form of those shown in other embodiments, and equivalents.

A multi-mode radio 606 may include an RF section 634 section, intermediate frequency (IF) stages 636-0/1, and baseband sections 638-0/1. An RF section 634 may perform radio transmission and reception functions in a radio frequency range, and may include filters, low noise input amplifiers, and/or output power amplifiers. In the embodiment shown, RF section 634 includes first RF hardware 640-0 corresponding to one protocol (Protocol A) and second RF hardware 640-1 corresponding to another protocol (Protocol B). That is, some RF hardware is protocol specific, while other RF hardware may be shared among protocols.

In the very particular embodiment shown, IF sections 636-0/1 may each be protocol specific. IF sections 636-0/1 may include circuits for down converting received signals to a lower IF, or upconverting IF signals to an RF range. IF sections 636-0/1 may include, without limitation, pre-amplifiers, modulators, and de-modulators. Baseband sections 638-0/1 may control operations of IF sections 636-0/1, as well as provide data paths to processing circuits 608.

In this way, a device that dynamically switches between wireless communication modes may include a radio having protocol specific RF hardware as well as RF hardware shared among multiple protocols.

Figure 7:
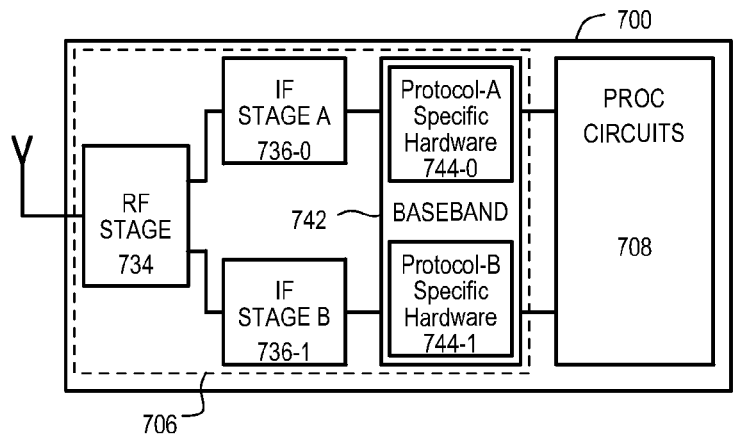

Referring to FIG. 7, yet another device according to an embodiment is shown in a block schematic diagram and designated by the general reference character 700. Device 700 may include a multi-mode radio 706 as well as processing circuits 708. Processing circuits 708 may take the form of those shown in other embodiments, and equivalents.

A multi-mode radio 706 may include an RF stage 734, IF stages 736-0/1, and baseband section 742. A baseband section 742 may include both protocol specific hardware (744-0/1) as well as shared baseband hardware. For example, some baseband section functions may be shared for multiple protocols.

In one embodiment, protocol specific hardware (744-0/1) may implement different modulation/de-modulation types.

It is noted that in other embodiments, other portions of a multi-mode radio may be protocol-specific. For example, in one embodiment an IF stage may have protocol specific hardware as well as protocol shared hardware.

In this way, a device that dynamically switches between wireless communication modes may include a radio having protocol specific baseband hardware as well as baseband hardware shared among multiple protocols.

The above embodiments have shown hardware for various sections that may be protocol specific or shared. In some embodiments, protocol specific circuits for one protocol may be disabled while the device operates according to another protocol. One particular embodiment showing such an operation is shown in FIGS. 8A to 8B.

Figure 8A:
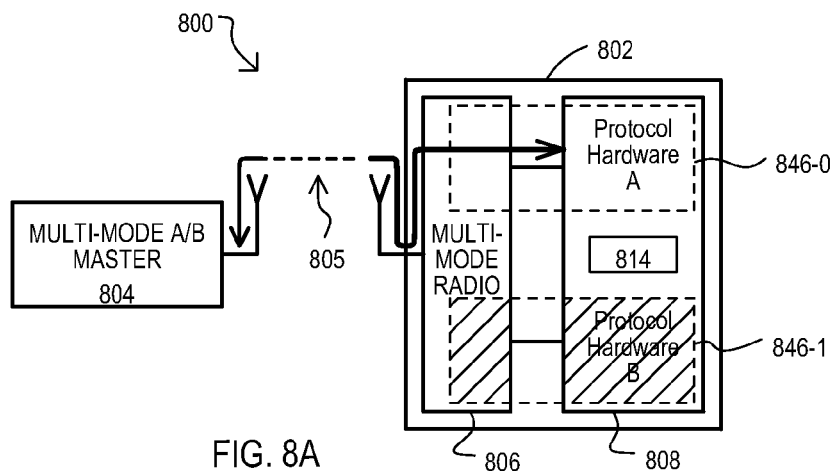
FIGS. 8A and 8B show a system having power reduction according to an embodiment.
Figure 8B:
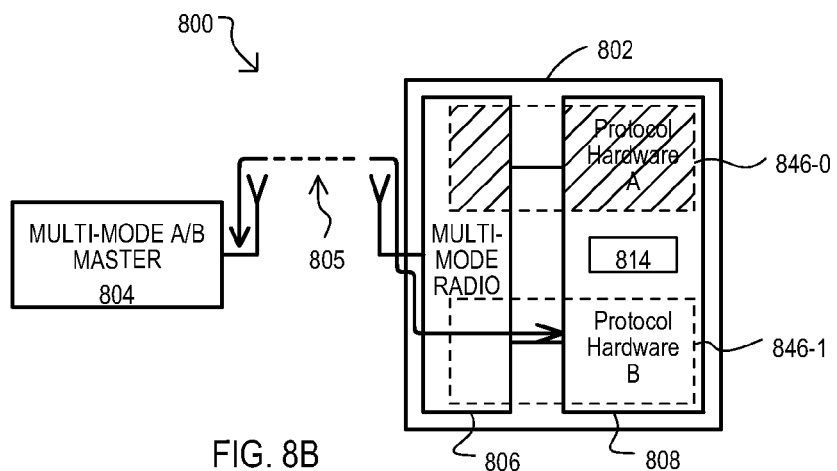

FIGS. 8A to 8B show a system according to an embodiment designated by the general reference character 800. A system 800 may include a slave device 802 and a master device 804 connected to one another over a wireless physical link 805.

A slave device 802 may include a multi-mode radio 806 and processor circuits 808. Multi-mode radio 806, processor circuits 808 or both, may include protocol specific hardware 846-0/1 according to any of the embodiments shown herein, or equivalents.

Referring to FIG. 8A, when operating according to a first protocol (Protocol A), hardware specific to such a protocol 846-0 may be enabled, allowing the transmission and reception of data over wireless link 805. Hardware not specific to the currently used protocol 846-1, may be disabled (as shown by hatching). Such a disabling of hardware may include, without limitation, placing such hardware into a "sleep mode", a disconnection of power to such circuits, or a reduction in power to such hardware that prevents normal operation yet results in some or all data states being retained.

Referring to FIG. 8B, in response to mode switch controller 814, slave device 802 may switch from one protocol (Protocol A) to another (Protocol B). Such an action may cause hardware specific 846-1 to the new protocol (Protocol B) to be enabled, allowing the transmission and reception of data over wireless link 805 according to the new protocol. Hardware not specific to the currently used protocol 846-0 may now be switched from an enabled state to a disabled state.

In this way, hardware specific to one protocol may be disabled when a device dynamically switches to another protocol.

Referring now to FIGS. 9A to 9C, embodiments show various approaches to controlling the enabling and disabling of protocol specific circuits. In the very particular embodiments shown, a device 900 may include a multi-mode radio 906 according to any of the embodiments shown herein, as well as processor circuits 908. Processor circuits 908 may include a first CPU 916 (which may operate according to a Protocol A) and a second CPU 930 (which may operate according to a Protocol B).

Referring to FIG. 9A, according to one embodiment, one or both of CPUs (916 and/or 930) may have timers or timing routines (949-0, 949-1) that may periodically change them from a disabled mode to an enabled mode.

In this way, hardware specific to one protocol may be periodically switched between disabled and enabled states according to one or more timers.

Referring to FIG. 9B, according to another embodiment, one or both of CPUs (916 and/or 930) may be switched from a disabled mode to an enabled mode in response to user signals generated from a user input circuit 948. A user input circuit 948 may generate enable signals (Wake NB) in response to one or more physical inputs from a user.

In this way, hardware specific to one protocol may be periodically switched between disabled and enabled states according to a user input.

Referring to FIG. 9C, according to another embodiment, one CPU (in this embodiment 916) may be switched from a disabled mode to an enabled mode in response to an input from another CPU (in this embodiment 930). In one particular embodiment, a second CPU 930 may be a low power CPU that enables first CPU 916 when such a CPU is used for a protocol that the low power CPU 930 cannot execute alone.

In this way, a processor specific to one protocol may be periodically switched between disabled and enabled states according to another processor.

While embodiments above have shown slave devices, other embodiments may include "master" devices that may control communications with one or more slave devices. A master device according to an embodiment is shown in FIG. 10, and designated by the general reference character 1000. A master device 1000 may include a multi-mode radio circuit 1006 and processing circuits 1008. A multi-mode radio circuit 1006 may include sections according to embodiments shown herein, or equivalents.

A processing circuit 1008 may include a first protocol (Protocol A) section 1010, a second protocol (Protocol B) section 1012, and mode switch controller 1014. A master device 1000 may further include a control section 1050. A control section 1050 may execute master device specific functions including security (e.g., providing authentication, encryption, channel setup codes), as well as coordinating with slave devices to enable multiple access to the master device. In one very particular embodiment, multiple access to a master device may be based on time-division multiplexing, and a control section 1050 may transfer data to slave devices that identifies time slots corresponding to a communication channel between the master device and the particular slave device.

A master device 1000 may also include a dynamic mode store 1052. A dynamic mode store 1052 may track a mode of communication for each slave device connected to a master device 1000. This is in contrast to a static mode store for systems that establish a communication mode when a device connects to the master and do not change the mode.

A single master device may have simultaneous active communication links with multiple slaves based on combinations of possible communication types. As but one example, if a master device may communicate by way of two protocols (Protocol A and Protocol B), such a master device may communicate with: a "Protocol A only" device using Protocol A (i.e., a single mode slave); a "Protocol B only" device using Protocol B (i.e., a single mode slave); a multi-mode slave device using one protocol (i.e., Protocol A); and a multi-mode device slave device using the other protocol (i.e., Protocol B).

In addition or alternatively, a master device may make a protocol decision for all devices of the network. In such a system, all slave devices may be multi-mode, and a master device may switch all such slave devices between different communication modes based on one or more system characteristics.

In this way, a master device in a radio wireless system may dynamically switch between different communication modes for one or more slave devices of the system.

The above embodiments have shown devices with multiple processors. Such processors may be connected to one another via common multiple signal paths, and may be on a same integrated circuit substrate, or assembled on a same circuit board. However, other embodiments may include processors, or other processing circuit sections separate from one another. Particular embodiments having such features will now be described.

Referring to FIG. 11, a device according to another embodiment is shown in a block schematic diagram and designated by the general reference character 1100. A device 1100 may be an assembly formed by physically connecting multiple components.

In the embodiment shown, a multi-mode radio 1106 and a first CPU 1116 may be formed on a same first component 1154, while a second CPU 1130 may be formed on a second component 1156. Components 1154 and 1156 may be assembled together (optionally with more components) to form a device 1100. A first CPU 1116 may communicate with a second CPU 1130 over a suitable communication path 1157. In one particular embodiment, a communication path 1157 may a low wire count bus, such as a serial bus operating according to a serial data protocol (e.g., serial peripheral interface (SPI), $I^2C$, etc.).

While the embodiment of FIG. 11 shows multi-mode radio 1106 in communication with first CPU 1116 and not in direct communication with second CPU 1130, in other embodiments there may be a direct connection path between multi-mode radio 1106 and second CPU 1116, in addition to, or in place of communication path 1157.

Figure 12A:
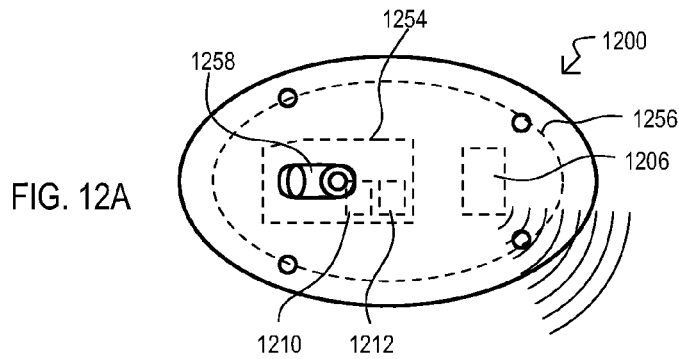
FIG. 12A to 12C are transparent plan views of devices according to embodiments.

Referring to FIG. 12A, a device according to another embodiment is shown in a bottom, transparent plan view, and designated by the general reference character 1200. A device 1200 may be a wireless computer mouse, configurable to dynamically switch between different communication modes. In a very particular embodiment, device 1200 may dynamically switch between Bluetooth® and Bluetooth® low energy (LE) protocols.

In the embodiment shown, a first processing section 1210, which may execute a first protocol (Protocol A) and a second processing section 1212, which may execute a second protocol (Protocol B) may be integrated with additional device hardware 1258 on a first component 1254. In the particular embodiment shown, additional device hardware 1258 may be an optical navigation sensor, and a first component may be printed circuit board. In another particular embodiment, additional device hardware 1258 may include a laser based optical navigation sensor integrated circuit package that includes a processor, where the processor executes position sensing functions as well as communication functions according to at least one protocol. One very particular embodiment may include an OvationONS™ Laser Navigation Sensor selected from the device family CYONS2xxx (where xxx various according device), manufactured by Cypress Semiconductor Corporation, having headquarters as noted above.

A multi-mode radio 1206 may be formed on a second component 1256. Optionally, a second processing section 1212 may also be formed on a second component 1256. A second component 1256 may be a second circuit board connected to the first circuit board by a high speed serial bus.

Figure 12B:
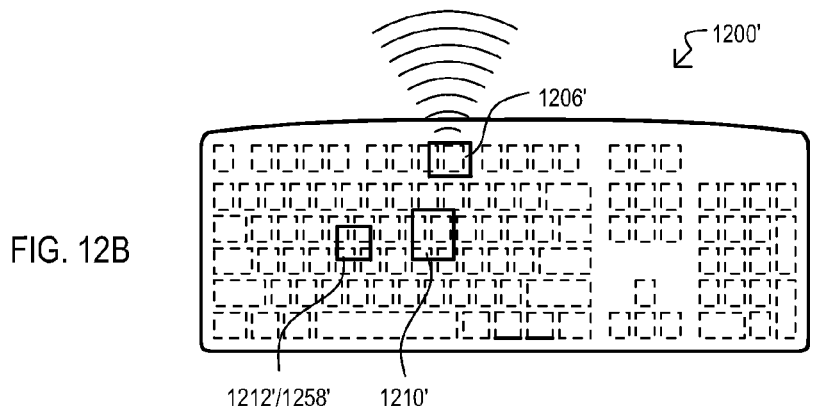

Referring to FIG. 12B, a device according to a further embodiment is shown in a transparent plan view, and designated by the general reference character 1200'. A device 1200' may be a wireless computer keyboard that may switch dynamically between different communication modes. In a very particular embodiment, device 1200' may dynamically switch between BT and (BLE) protocols.

In the embodiment shown, a first processing section 1210' may execute a first protocol (Protocol A). A second processing section 1212' may be combined with, or be the same as, additional device hardware 1258'. In one embodiment, second processing section/additional hardware (1258') may be a processor that may perform standard keyboard functions, including the scanning of keys to detect user inputs, as well as processing for a particular protocol. A multi-mode radio 1206' may be in communication with first and second processing sections (1210' and 1212'). Such communication may be via a direct path or an indirect path.

Figure 12C:
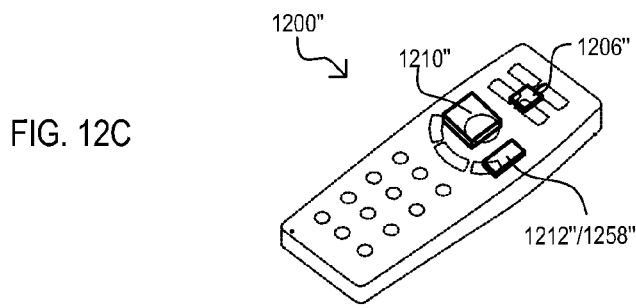

Referring to FIG. 12C, a device according to yet another embodiment is shown in a transparent plan view, and designated by the general reference character 1200". A device 1200" may be a remote control that may switch dynamically between different communication modes. In a very particular embodiment, device 1200" may dynamically switch between BT and (BLE) protocols.

In the embodiment shown, a first processing section 1210" may execute a first protocol (Protocol A). A second processing section 1212" may be combined with, or be the same as, additional device hardware 1258". Additional hardware 1258" may include a processor that performs various remote control functions, including key detection, controlled device identification, etc. Such a processor may also perform data processing functions for a protocol. As in case of other embodiments, a multi-mode radio 1206" may be in communication with first and second processing sections (1210" and 1212"), via a direct path or an indirect path.

In this way, different sections of processor circuits may be situated on different components of an assembly. Further, processor circuits that perform protocol functions may also be used to perform device application functions.

Embodiments may include wireless communications according to various transmission methods, including but not limited to frequency hop spread spectrum (FHSS), direct sequence spread spectrum (DSSS), chirp spread spectrum (CSS), frequency-shift keying (FSK), binary phase shift keying (BPSK) and/or quadrature phase shift keying (QPSK). However, in one particular embodiment, a method and/or corresponding device may dynamically switch between communication modes in which one mode utilizes a subset of the channel frequencies of another mode. Such an embodiment will be described with reference to FIGS. 13A and 13B.

Figure 13A:
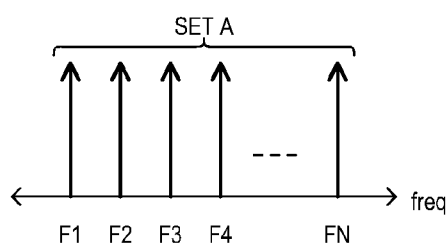
FIGS. 13A and 13B show frequency selection sets of different communication methods according to an embodiment.

Referring to FIG. 13A, a diagram shows a first set (SET A) of channel frequencies (F1 to FN) that are selectable by a first communication protocol (Protocol A). In some embodiments, such frequencies may be carrier frequencies that are modulated to thereby transmit data values. In particular embodiments, frequencies F1 to FN may have an equal spectral separation from one another.

Figure 13B:
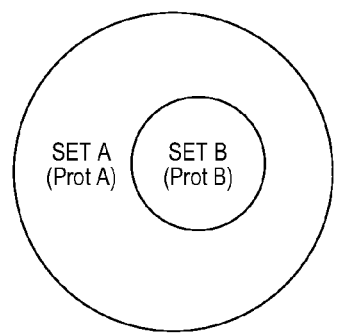

Referring to FIG. 13B, a Venn diagram shows how a set of channel frequencies (SET B) of one protocol (Protocol B) may be a subset of that utilized in another protocol (Protocol A, Set A).

It is noted that a frequency set (SET A or SET B) may represent possible frequencies for selection by a protocol, and not actual frequencies utilized. In particular, some embodiments may employ "adaptive" frequency hopping (AFH), adapting a set of frequencies according to conditions by avoiding frequencies subject to interference or otherwise undesirable in a transmission method.

In this way, a device and/or method may dynamically switch between two or more different protocols, where one protocol utilizes a sub-set of the frequencies utilized by another protocol.

As described above, embodiments may include two or more protocols in which carrier frequencies may be selected from a set of frequencies (e.g., direct sequence, or hopping).

In one particular embodiment, one protocol may employ AFH, while the other may not employ AFH.

Embodiments may include wireless communications that allow for access from multiple devices, including but not limited to time division multiplexing (TDMA), frequency division multiplexing (FDMA), and/or code division multiple access (CDMA). However, in one particular embodiment, a method and/or corresponding device may include TDMA, with a master device designating a time slot for an active communication method with a slave device, while reserving a time slot for an unused communication method for the same slave device. Such an embodiment is shown in FIG. 14.

Figure 14:
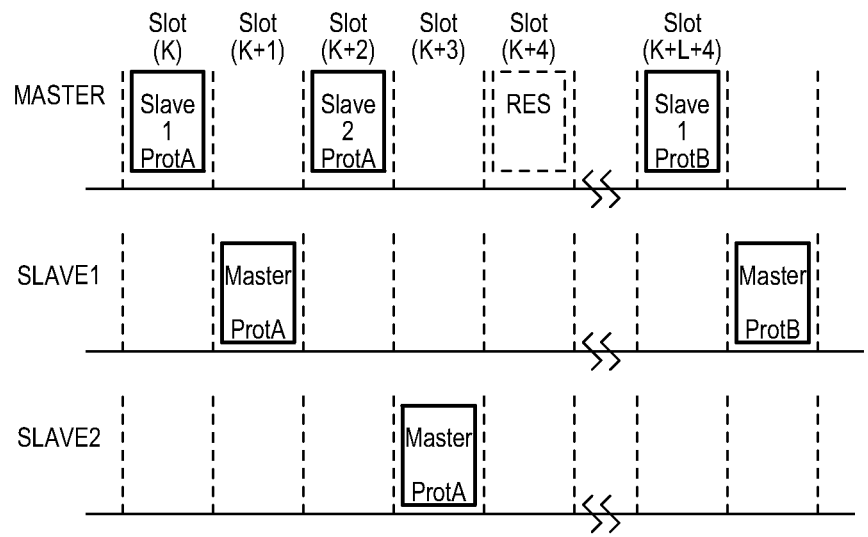
FIGS. 14 and 15 shows dynamic switching in a time division multiplexed system according to embodiments.

Referring to FIG. 14, a timing diagram shows data received during particular timeslots by a master device (MASTER) and two slave devices (SLAVE1 and SLAVE2). In FIG. 14 it is assumed that master device is communicating with both slave devices (SLAVE1 and SLAVE2) according to a first protocol (Protocol A). Accordingly, in time slot Slot(K), a master device may receive data from a first slave according to Protocol A, and in time slot Slot(K+1) a slave device SLAVE1 may receive data from the master device according to Protocol A.

As shown by time slot Slot(K+4) a master device may reserve a time slot for communication with an existing slave device according to a different protocol, in the event the slave device dynamically changes protocols.

Referring still to FIG. 14, it is assumed that slave device SLAVE1 dynamically switches from Protocol A to Protocol B. As shown by time slot Slot(K+L+4) (a previously reserved time slot), a master device may receive data from a first slave according to new Protocol B. It is assumed that Protocol B is also a TDMA protocol suitably adaptable to the time division multiplexing of Protocol A.

Arrangements in which different protocols are compatible with a same access method (e.g., both are compatible with a same TDMA scheme, as described for FIG. 14) may enable on-the-fly switching between protocols. That is, a master and slave device do not negotiate to establish a connection in response to a protocol switch. However, in alternate embodiments, switching between protocols may require negotiation. For example, each time a protocol switch is made, a negotiation may be conducted to optimize access for the slave device, or all slave devices of the system. In addition or alternatively, while a system operates with a relatively small number of devices and/or operating channels, protocol switching may be done on-the-fly. However, once the number of devices reaches a certain limit and/or the number of active channels reaches a limit, a protocol switch may involve re-allocation of network resources, and thus include a negotiation between a master device and one or more slave devices.

Other embodiments having TDMA may designate time slots for both a primary communication method as well as a secondary communication method. Such an embodiment is shown in FIG. 15.

Figure 15:
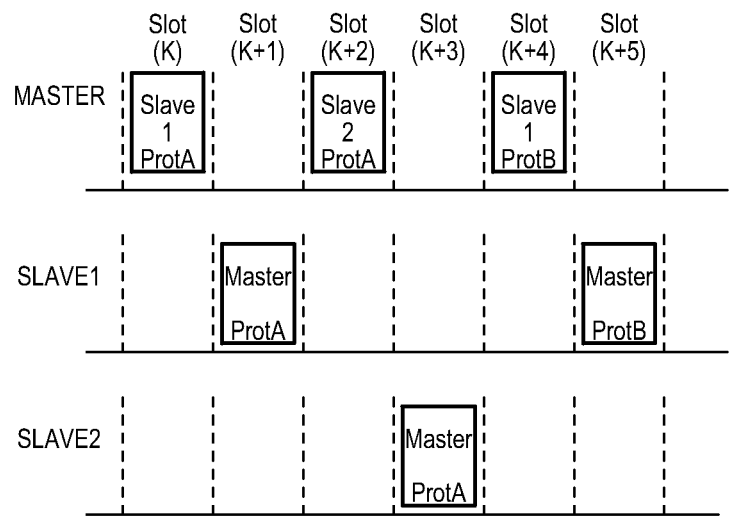

Referring to FIG. 15, a timing diagram shows data received during particular timeslots between a master device (MASTER) and two slave devices (SLAVE1 and SLAVE2). In FIG. 15, it is assumed that master device is communicating with slave device SLAVE2 according to one protocol (Protocol A). In contrast, master device is communicating with slave device SLAVE1 according to two protocols (Protocols A and B) at the same time.

In one embodiment, for a slave device SLAVE1 communicating according to multiple protocols, at any one time, one protocol may be a primary protocol, carrying most of the data between the slave and master device, while the other protocol may be used to keep a channel open (e.g., synchronized and/or optimized). In the event the slave device switches to Protocol B, such a protocol will become the primary protocol with Protocol A being a secondary protocol (e.g., may be active just to keep the channel open). As in the case of FIG. 14, in FIG. 15 it is assumed that Protocol B is also a TDMA protocol adaptable to the time division multiplexing of Protocol A.

In this way, embodiments may utilize TDMA and designate different time slots for different protocols to enable dynamic switching between protocols.

In systems in which protocols share a compatible TDMA method, a primary protocol may differ from a secondary protocol in one or more ways. Embodiments showing such variations will now be described.

In one embodiment, when a first protocol is in use as a primary protocol, it may be allocated a first number of time slots. A secondary protocol may be allocated (but not necessarily) use, a second number of timeslots that is substantially smaller than the first number. In the event the second protocol is switched to be the primary protocol, the second protocol may be allocated a larger number of timeslots, while the first (no longer primary) protocol may have a reduction in allocated time slots.

In this way, a number of timeslots for a given protocol may be dynamically switched between multiple protocols in response to one or more system characteristics.

In similar fashion, in another embodiment, a first protocol may be a primary protocol and have more frequent timeslots than a second protocol, serving as a secondary protocol. Upon a dynamic switch between protocols, the second protocol, now acting as the primary protocol, may be allocated more frequent timeslots than the first protocol, now acting as a secondary protocol.

In this way, timeslot frequency for a given protocol may be dynamically switched between multiple protocols in response to one or more system characteristics.

Referring now to FIGS. 16A to 16E, a personal area network (PAN) system and method according to an embodiment is shown in sequence of diagrams.

Figure 16A:
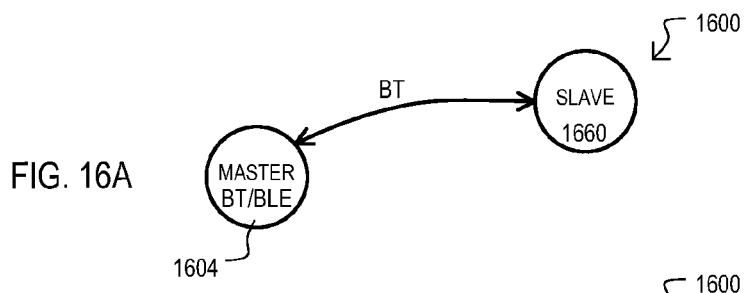
FIGS. 16A to 16E show a personal area network (PAN) and method according to one embodiment.

Referring to FIG. 16A, a personal area network (PAN) 1600 is shown that may include a master device 1604 and optionally a non-dynamic switching slave device 1660. A master device 1604 may be a dual-mode device, capable of communicating according to two or more modes. In the embodiment shown, a master device 1600 may communicate according to the Bluetooth® protocol (BT) and Bluetooth® low energy (BLE) protocol. Slave device 1660 may be capable only of communicating according to BT with master device 1604.

Figure 16B:
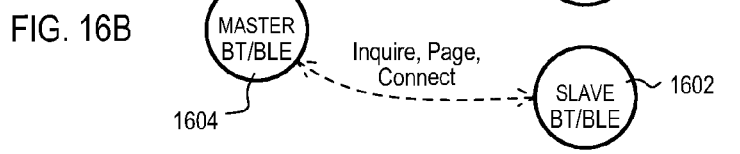

Referring to FIG. 16B, a slave device 1602 may be added to PAN 1600. A slave device 1602 may be a dual-mode device, capable of communicating according to two or more modes according to any of the embodiments shown herein, or equivalents. In the embodiment shown, slave device 1602 may dynamically switch between BT and BLE. In FIG. 16B, a slave device 1602 may form a connection with master device 1604 according to the BLE protocol (shown as Inquire, Page, Connect).

Figure 16C:
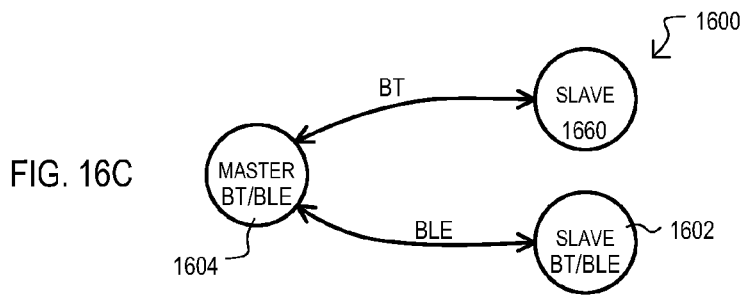

Referring to FIG. 16C, a slave device 1602 has established a connection with master device 1604 according to the BLE protocol.

Figure 16D:
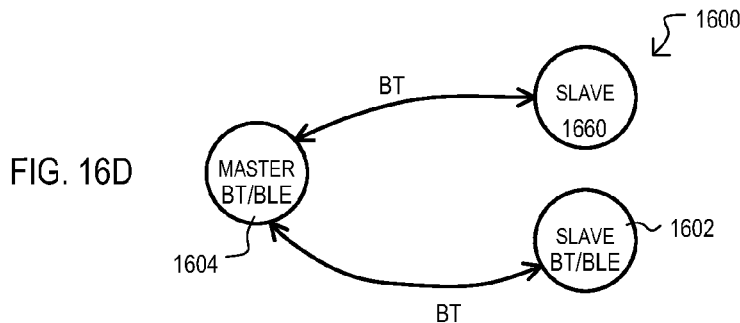

Referring to FIG. 16D, in response to predetermined characteristics of the PAN 1600, slave device 1602 may switch communication methods with the master device 1604 from BLE to BT.

Figure 16E:
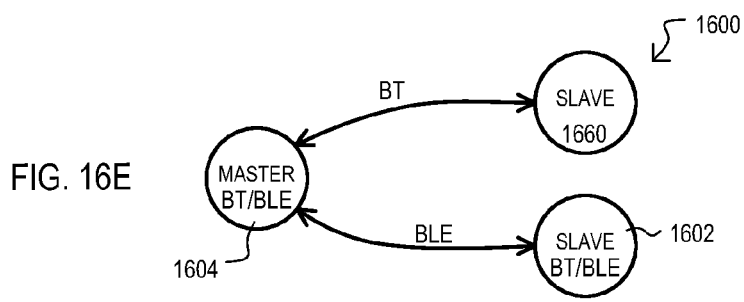

Referring to FIG. 16E, in response to new characteristics of the PAN 1600, slave device 1602 may return to communicating with the master device 1604 according to the BLE protocol.

Referring now to FIGS. 17A to 17E, a personal area network (PAN) system and method according to another embodiment is shown in sequence of diagrams.

Figure 17A:
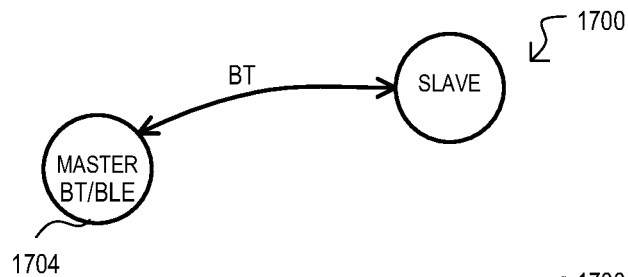
FIGS. 17A to 17D show a PAN and method according to another embodiment.

Referring to FIG. 17A, a personal area network (PAN) 1700 having an arrangement like that of FIG. 16A is shown.

Figure 17B:
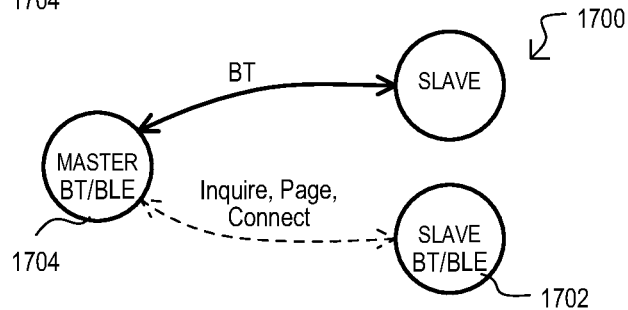

Referring to FIG. 17B, a slave device 1702 may be added to PAN 1700. A slave device 1702 may be a dual-mode device, capable of communicating according to two or more modes according to any of the embodiments shown herein, or equivalents. In the embodiment shown, slave device 1702 may dynamically switch between BT and BLE. In FIG. 17B, a slave device 1702 may form a connection with master device 1704 according to both the BLE and BT protocols.

Figure 17C:
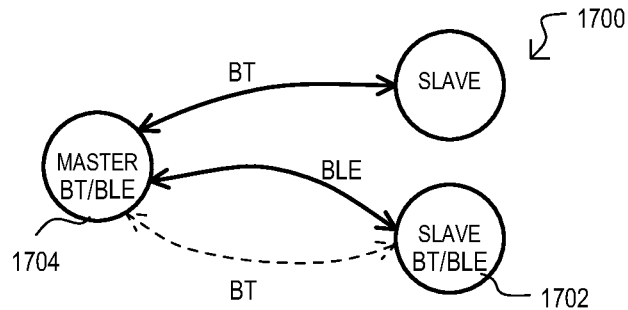

Referring to FIG. 17C, a slave device 1702 may have established a connection with master device 1704 according to both BLE and BT protocols, but may utilize a BLE protocol connection as a primary connection (e.g., majority of data between devices is transferred over BLE connection).

Figure 17D:
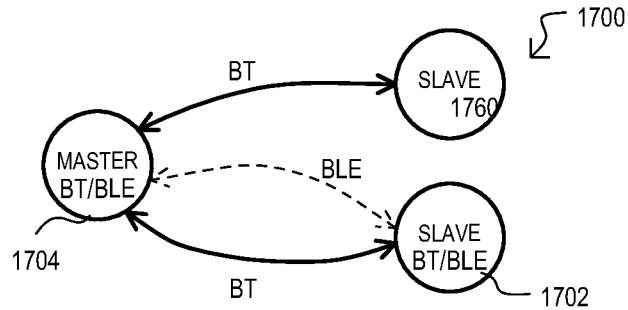

Referring to FIG. 17D, in response to predetermined characteristics of the PAN 1700, slave device 1702 may dynamically switch the BT connection to be the primary connection, resulting in the BLE connection being maintained, but not carrying substantial data.

In this way, a slave device in a PAN may dynamically switch between different communication methods with a master device of the PAN.

Embodiments may dynamically switch between two or more communication methods in response to system conditions/characteristics. Very particular methods for signifying a switch will now be described with reference to FIGS. 18A to 18H. These methods may be used individually or in combinations with one another. It is understood that FIGS. 18A to 18H are but a few of the possible ways in which characteristics may be used to switch (or not switch) modes.

The embodiments shown in FIGS. 18A to 18H may be implemented as instructions executable by a processor, or an equivalent circuit.

It is noted that the decision to switch from one protocol or another (as a sole or primary protocol), may reside in one or multiple devices of a system. For example, a decision to switch between protocols may be exclusively made by a master device or a slave device. Alternatively, such a decision may be negotiated between a master device and a slave device. Still further, such a decision may be made independently by either a master device or a slave device.

FIG. 18A shows dynamic switching according to one or more error rates. In the embodiment shown, a bit error rate and/or a packet error rate may be compared to one or limits to control dynamic switching. In one embodiment, if an error rate is too high, a device may switch to a more robust communication method, if such a communication method is available. In addition or alternatively, an error rate may be a relative rate compared to other channels/methods. It is noted that an error rate may be taken along one channel, selected of multiple channels, and/or all channels of system.

FIG. 18B shows dynamic switching according to a polling rate. In this embodiment, it is assumed that a communication method calls for a polling packet to be periodically emitted from a device in a system (e.g., a master device). If a desired polling rate is outside of one or more limits, a device may switch to another, more robust and/or higher throughput communication method.

FIG. 18C shows dynamic switching according to a latency value. In this embodiment, it is assumed that a communication method used enables a latency of a data transmission to be measured. As but one example, a bit latency or packet latency may be measured by return data transmissions (e.g., acknowledgements). If a latency rate is outside of one or more limits, a device may switch to another, lower latency communication method. In addition or alternatively, switching between latency may be context dependent. For example, a second protocol may have a higher latency than first protocol, due to a "wake" procedure. To minimize delay, communications may start using the first protocol, and once a channel is ready using the second protocol, the protocol switch may be made.

FIG. 18D shows dynamic switching according to an RF environment. In one embodiment, a background or interfering RF energy may be measured. If the measured background/interfering energy is too high, a device may switch to a more robust communication method, if such a communication method is available. It is noted that a background/interfering RF measurement may be taken across one channel, multiple channels, or all channels. Such a measurement may be taken in one communication mode, or multiple communication modes. Further, such a measurement may be according to various approaches, including but not limited to, an absolute value or a value relative to system signal strength. Similarly, such a measurement may be a peak value over a given time period, a time averaged value, or some combination thereof.

In one very particular embodiment, interfering/background RF energy levels may be measured on one or all of the BLE channels, and if such energies are too high, a device may switch to a full BT protocol.

In another very particular embodiment, RF energy may be measured at different protocol specific processing stages. For example, if reference is made to FIG. 6, background/interfering RF measurements may be made at different RF stages (e.g., 634-0/1) and/or different IF stages (e.g., 636-0/1).

FIG. 18E shows dynamic switching according to a time measurement with respect to a device event. In FIG. 18E, a count value may be reset. A device (e.g., master and/or slave) may be checked to determine if an event has occurred. If an event occurs, a count may be reset once again. If an event has not occurred, a count may be compared to a limit. If a count is not outside a limit, a count may be incremented and the event checked for once again. If the event does not occur within a given time period (i.e., count outside of limit(s)), a device may dynamically switch modes.

A device event may take various forms, including but not limited to, receiving a transmission from one or more other devices, being polled by another device, or a normal operator event (e.g., mechanical actuation, movement, capacitance sense, audio input, light sense, etc.). Accordingly, if too much time passes after such an event, a communication method may switch.

FIG. 18F shows dynamic switching according to power conditions. A power feature of one or more devices may be measured. If such a power feature is outside of one or more limits, a device may switch communication modes. In one embodiment, a power feature may be power source voltage measurement and/or a calculated remaining life of a power source. If the power measurement is outside of a limit, a device may switch to a communication method that consumes less power.

Figure 18G:
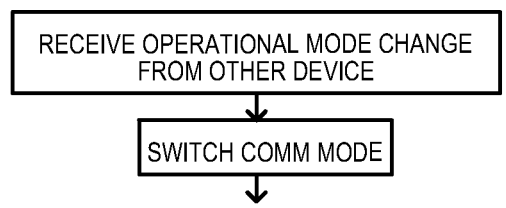

FIG. 18G shows dynamic switching according to a change in operational mode of another device. A device may receive an operational mode change indication from another device of a system. In response to such an indication, a device may switch communication methods. In one particular embodiment, in response to receiving an indication that a master device is switching to lower power consuming mode (e.g., standby mode), a slave device may switch to a communication method that consumes less power.

Figure 18H:
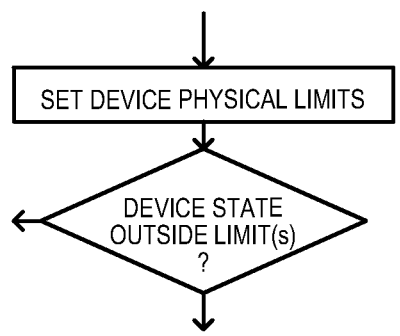

FIG. 18H shows dynamic switching based on a device physical state. Device physical state limits may be set. Device physical limits may include, but are not limited to, device velocity, device acceleration, device orientation, and/or device position relative to one or more other objects. If a device physical state changes in one or more particular ways, a device may dynamically switch to another protocol.

As but one very particular embodiment, a wireless mouse, when at rest or moving slowly, may have a first set of requirements (e.g., latency, throughput, etc.), and thus communicate according to a first protocol. However, when moving quickly, a second set of requirements may be needed, and thus the mouse may switch to a second protocol. As the mouse is used, it may switch back and forth between different protocols as needed according to its physical state. As noted above, the various methods shown in FIGS. 15A to 15H may be used in conjunction with one another. Thus, in the case of the wireless mouse, a threshold (movement speed) at which a switch in protocols is made, may be varied according to RF environment, etc.

It should be appreciated that in the foregoing description of exemplary embodiments. Various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment.

It is also understood that the embodiments of the invention may be practiced in the absence of an element and/or step not specifically disclosed. That is, an inventive feature of the invention may be elimination of an element.

Accordingly, while the various aspects of the particular embodiments set forth herein have been described in detail, the present invention could be subject to various changes, substitutions, and alterations without departing from the spirit and scope of the invention.

What is claimed is:

1. A method, comprising:
    establishing, by a slave device, a first channel to communicate with a master device in a first communication mode by reserving a first number of timeslots corresponding to the first channel for the slave device to communicate with the master device in the first communication mode;
    reserving a second number of timeslots corresponding to a second channel for the slave device to communicate with the master device in a second communication mode during the establishment of the first channel; and
    switching, by the slave device, between communicating through the first channel in the first communication mode and through the second channel in the second communication mode in accordance with at least one predetermined characteristic corresponding to the communication between the slave device and the master device.

2. The method of claim 1, further comprising communicating, by the slave device, with the master device with the first communication mode or the second communication mode using time division multiple access (TDMA) over a personal area network.

3. The method of claim 1, wherein the first communication mode includes communications according to a Bluetooth® protocol and the second communication mode includes communications according to a Bluetooth® Low Energy protocol.

4. The method of claim 1, wherein the switching between communicating through the first channel in the first communication mode and through the second channel in the second communication mode further comprises exchanging the first number of timeslots for the first channel with the second number of timeslots for the second channel.

5. The method claim 1, wherein the at least one predetermined characteristic includes characteristics of the first communication mode or the second communication mode.

6. The method claim 5, wherein the characteristics of the at least one communication mode include at least one of a bit rate error, a packet rate error, a rate at which predetermined communication values are received at one device, a transmission latency between at least two devices, or a background energy on at least on radio frequency channel.

7. The method of claim 1, wherein the at least one predetermined characteristic includes characteristics of the slave device or the master device.

8. The method of claim 7, wherein the characteristics of the slave device or master device include at least one of a user event on one device, a device power supply characteristic, a quality of data transmitted by the device, a device mode of operation, or a device physical state.

9. A system, comprising:
a first device comprising a digital radio transceiver configured to communicate in a first communication mode and a second communication mode with a second device and comprising processing circuits configured to establish a first channel to communicate with the second device in the first communication mode by reserving a first number of timeslots corresponding to the first channel for the first device to communicate with the second device in the first communication mode and reserve a second number of timeslots corresponding to a second channel for the first device to communicate with the second device in the second communication mode during the establishment of the first channel, wherein the processing circuits are configured to switch between processing signals exchanged through the first channel and the second channel by the digital radio transceiver in response to predetermined system characteristics, the processing circuits comprising at least a first processor that processes signals according to at least the first mode, and at least a second processor that processes signals according to at least the second mode.

10. The system of claim 9, wherein the first processor consumes more power when processing signals according to the first communication mode than power consumed by the second processor when processing signals according to the second communication mode.

11. The system of claim 9, wherein the first processor is switchable from a first power consuming state to a lower power consuming state in response to the second processor processing signals according to at least the second communication mode.

12. The system of claim 9, wherein the first communication mode includes a Bluetooth® protocol and the second communication mode includes a Bluetooth® Low Energy protocol.

13. The system of claim 9, wherein the first device provides application functions separate from communication functions, and the first processor executes application instructions in addition to processing signals according to at least the first communication mode.

14. The system of claim 13, wherein the first device is a human interface device for an electronic system, a remote control device, a data storage device, or an equipment monitoring device.

15. A method, comprising:
establishing a wireless network between at least one slave device and a master device, wherein the wireless network includes a first channel and a second channel that are both reserved for communication between the at least one slave device and the master device during the establishment of the wireless network, and wherein the first channel is established by reserving a first number of timeslots corresponding to the first channel for the at least one slave device to communicate with the master device and the second channel is established by reserving a second number of timeslots corresponding to the second channel for the slave device to communicate with the master device; and
switching between the first channel and the second channel according to predetermined network conditions, wherein the first channel is selected from among a set of frequencies and the second channel is selected from among a sub-set of the set of frequencies.

16. The method of claim 15, wherein at least one of the first channel or the second channel omits a frequency of its set or subset based on at least one predetermined transmission condition.

17. The method of claim 15, wherein the first and second channels are both time division multiple access.

18. The method of claim 15, wherein the first channel frequency hops between the set of frequencies, and wherein the second channel frequency hops between the subset of frequencies.

19. The method of claim 18, wherein the first channel frequency hops according to pseudorandom sequences, and wherein the second channel frequency hops according to fixed sequences.

* * * * *